US011500808B1

(12) United States Patent
Ganor et al.

(10) Patent No.: US 11,500,808 B1
(45) Date of Patent: Nov. 15, 2022

(54) PERIPHERAL DEVICE HAVING AN IMPLIED RESET SIGNAL

(71) Applicant: MELLANOX TECHNOLOGIES, LTD., Yokneam (IL)

(72) Inventors: Avraham Ganor, Shoham (IL); Peter Paneah, Nesher (IL); Dotan David Levi, Kiryat Motzkin (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/384,834

(22) Filed: Jul. 26, 2021

(51) Int. Cl.
*G06F 13/42* (2006.01)
*G06F 13/40* (2006.01)
*G06F 11/14* (2006.01)
*G06F 1/3234* (2019.01)
*G06F 9/448* (2018.01)

(52) U.S. Cl.
CPC .......... *G06F 13/4221* (2013.01); *G06F 1/325* (2013.01); *G06F 9/4498* (2018.02); *G06F 11/1441* (2013.01); *G06F 13/4027* (2013.01); *G06F 13/4063* (2013.01); *G06F 2213/0026* (2013.01)

(58) Field of Classification Search
CPC ............. G06F 13/4221; G06F 13/4027; G06F 13/4063; G06F 2213/0026; G06F 9/4498; G06F 1/325; G06F 11/1441
See application file for complete search history.

(56) References Cited

U.S. PATENT DOCUMENTS

| 6,085,332 A * | 7/2000 | El-Batal ............... G06F 3/0689 710/1 |
| 8,671,236 B2 | 3/2014 | Goldenberg et al. |
| 10,148,746 B2 | 12/2018 | Itkin et al. |
| 10,164,905 B2 | 12/2018 | Hayut et al. |
| 10,303,635 B2 | 5/2019 | Itkin |
| 10,311,004 B2 | 6/2019 | Bailey et al. |
| 10,318,312 B2 | 6/2019 | Itkin et al. |
| 10,691,576 B1 * | 6/2020 | Shapira ............... G06F 11/2221 |
| 10,775,871 B2 * | 9/2020 | Garg ..................... G06F 9/4418 |
| 11,057,637 B1 | 7/2021 | Levi et al. |
| 2006/0271881 A1 * | 11/2006 | Luciani ............... G06F 11/1441 715/790 |
| 2014/0129741 A1 | 5/2014 | Shahar et al. |
| 2015/0227430 A1 * | 8/2015 | Saitou ................ G06F 13/4022 714/23 |
| 2020/0014918 A1 | 1/2020 | Levi et al. |
| 2020/0014945 A1 | 1/2020 | Levi et al. |
| 2020/0349064 A1 * | 11/2020 | Lim .................... G06F 12/0238 |

OTHER PUBLICATIONS

"PCI Express® Base Specification," Revision 4.0, version 1.0, pp. 1-1293 pages Sep. 27, 2017.

* cited by examiner

*Primary Examiner* — Nimesh G Patel
(74) *Attorney, Agent, or Firm* — Kligler & Associates Patent Attorneys Ltd (57) ABSTRACT

A peripheral device includes a bus interface and circuitry. The bus interface is configured to connect to a peripheral bus for communicating with a host in accordance with a peripheral-bus specification that specifies a physical reset signal asserted by the host. The circuitry is configured to execute predefined logic that evaluates a reset condition that is indicative of imminent assertion of the physical reset signal by the host, and to perform a reset procedure in response to meeting the reset condition.

30 Claims, 4 Drawing Sheets

PERIPHERAL DEVICE HAVING AN IMPLIED RESET SIGNAL

TECHNICAL FIELD

Embodiments described herein relate generally to a peripheral device communicating over a bus, and particularly to methods and systems for a peripheral device having an implied reset signal.

BACKGROUND

A peripheral device typically connects to other elements such as a host processor using a suitable bus, e.g., a peripheral component bus. To control data communication between the host and the peripheral device, the bus typically comprises certain physical control signals such as a clock signal and a reset signal.

Methods for managing control signals of a peripheral component bus are known in the art. For example, U.S. Pat. No. 8,671,236 describes a method for computing that includes connecting a host device to a peripheral device via a bus that is physically configured in accordance with a predefined standard and includes multiple connection pins that are specified by the standard, including a plurality of ground pins. At least one pin, selected from among the pins on the bus that are specified as the ground pins, is used in order to indicate to the peripheral device that the host device has an extended operational capability.

In various multi-host applications, a peripheral device serves multiple hosts. For example, U.S. Patent Application Publication 2014/0129741 describes a method that includes establishing in a peripheral device at least first and second communication links with respective first and second hosts. The first communication link is presented to the first host as the only communication link with the peripheral device, and the second communication link is presented to the second host as the only communication link with the peripheral device. The first and second hosts are served simultaneously by the peripheral device over the respective first and second communication links.

Peripheral Component Interconnect Express (PCIe) is a computer expansion bus standard, which is used for connecting hosts to peripheral devices such as Network Interface Cards (NICs), storage devices and hardware accelerators. PCIe is specified, for example, in the PCI Express Base Specification, Revision 5.0, Version 1.0, released on May 28, 2019.

SUMMARY

An embodiment that is described herein provides a peripheral device that includes a bus interface and circuitry. The bus interface is configured to connect to a peripheral bus for communicating with a host in accordance with a peripheral-bus specification that specifies a physical reset signal asserted by the host. The circuitry is configured to execute predefined logic that evaluates a reset condition that is indicative of imminent assertion of the physical reset signal by the host, and to perform a reset procedure in response to meeting the reset condition.

In some embodiments, the predefined logic includes a State Machine (SM) having multiple states and multiple transitions among the states, and the circuitry is configured to evaluate the reset condition by tracking the transitions among the states. In other embodiments, the circuitry is configured to evaluate the reset condition by identifying a transition of the SM from a first state among the states in which a status of the link indicating that the link is up, to a second different state among the states in which the status of the link indicating that the link is down. In yet other embodiments, the circuitry is configured to evaluate the reset condition irrespective of receiving any actual physical reset signal from the host.

In an embodiment, the bus interface of the peripheral device includes a physical reset input for receiving the physical reset signal from the host, but the circuitry is configured to evaluate the reset condition irrespective of a logical state of the physical reset input. In another embodiment, the bus interface of the peripheral device does not include a physical reset input for receiving the physical reset signal from the host. In yet another embodiment, the peripheral-bus specification includes a Peripheral Component Interconnect Express (PCIe) specification, and the physical reset signal includes a PERST signal of the PCIe specification.

In some embodiments, the circuitry is configured to communicate with the host over a link including one or more lanes of the peripheral bus, and to decide that the reset condition is met by identifying that a status of the link has changed from indicating that the link is up to indicating that the link is down. In other embodiments, the circuitry is configured to receive from the host one or more messages for requesting the peripheral device to enter a low power mode, and to enter the low power mode in response to meeting the reset condition after receiving the one or more messages. In yet other embodiments, the peripheral device is selected from a list including: a network adapter, a Network Interface Card (NIC), a smart NIC, a Graphics Processing Unit (GPU), a Central Processing unit (CPU), a video compression module, and an acceleration device.

In an embodiment, the peripheral bus includes N data lanes, N being an integer larger than 1, and the circuitry is configured to communicate with the host via the bus interface over a number of data lanes smaller than N. In another embodiment, the circuitry is configured to communicate with the host over one or more data lanes of the peripheral bus, and to detect de-assertion of the physical reset signal by the host, by sensing an impedance level of one or more of the data lanes. In yet another embodiment, the peripheral device connects over the peripheral bus to multiple hosts using multiple respective links, and the circuitry is configured to evaluate the reset condition associated with a given host among the multiple hosts, based at least on monitoring a link including one or more data lanes that connect between the peripheral device and the given host.

In some embodiments, the peripheral bus includes multiple data lanes, and first and second links used for connecting first and second hosts among the multiple hosts include different respective first and second numbers of the data lanes. In other embodiments, the peripheral device includes a video compression module, configured to receive from the hosts, over the respective links, raw video data for producing corresponding compressed video data, and the links include respective number of data lanes depending on video compression levels respectively required by the hosts.

There is additionally provided, in accordance with an embodiment that is described herein, a method, including, in a peripheral device that connects using a bus interface to a peripheral bus for communicating with a host in accordance with a peripheral-bus specification that specifies a physical reset signal asserted by the host, executing predefined logic that evaluates a reset condition that is indicative of imminent assertion of the physical reset signal by the host. A reset procedure is performed in response to meeting the reset condition.

These and other embodiments will be more fully understood from the following detailed description of the embodiments thereof, taken together with the drawings in which:

DETAILED DESCRIPTION OF EMBODIMENTS

Overview

Embodiments that are described herein provide methods and systems for detecting an implied reset condition in a peripheral device, irrespective of receiving any actual physical reset signal. Some embodiments that are described herein provide methods and systems that benefit by using the implied reset condition instead of a physical reset signal.

A peripheral device typically communicates with other elements over a suitable bus or link comprising multiple lanes for carrying data. Such a bus is sometimes referred to as a "peripheral bus" or a peripheral component bus." The bus typically comprises one or more lanes that carry control signals such as a clock signal and a reset signal. A peripheral component bus may comprise a single data lane, or multiple data lanes for increased data rate. An example bus for connecting a peripheral device comprises the Peripheral Component Interface Express (PCIe) bus, cited above.

In a multi-host application, a peripheral device communicates with multiple hosts over multiple respective links, each of which comprising one or more lanes of the peripheral component bus.

In principle, the lanes of the bus may be rigidly partitioned among the hosts. Such a rigid partition, however, consumes a large silicon area in the peripheral device. Moreover, different peripheral devices are typically produced for supporting different lane partitions. Using a rigid lane partition thus imposes a burden on design, production, and marketing of the peripheral device.

In some embodiments, a peripheral device that comprises N lanes, supports flexible lane partitions. Such a peripheral device may support up to N hosts. When connecting to N hosts, the peripheral device communicates with each of the N hosts over a single data lane. When using less than N hosts, the peripheral device may communicate with at least one of the hosts using a link comprising multiple data lanes. In some embodiments, the peripheral device supports a configurable partition of the data lanes, e.g., depending on the underline application. Moreover, an already configured lane partition can be easily modified in the field.

In accordance with the PCIe specification, a link of one or more data lanes of the bus, that is used for communication between a peripheral device and a host is associated with a reference clock signal, and with a reset signal that is referred to as a PCIe reset (PERST) signal. In the description that follows, "data lanes" are also simply referred to as "lanes" for brevity.

In conventional implementations, the PCIe link between the peripheral device and a host has a dedicated reference clock signal and a dedicated PERST signal. Such a conventional configuration is expensive in terms of silicon area, e.g., because each link may require a dedicated Phase Locked Loop (PLL) circuit for clock recovery. In addition, PERST signal connectivity typically requires a large number of Input/Output (I/O) connections, which in turn requires to increase the pin-count of the chip. Moreover, the reference clock signal and the PERST signal need to be wired between the peripheral device and each of the hosts. This wiring scheme is non-flexible and cannot be used freely in different multi-host configurations.

In some disclosed embodiments, a common reference clock signal and a common global reset signal are used by the peripheral device and the hosts, and no physical PERST signals are wired between the peripheral device and the hosts. Such a wiring scheme allows full flexibility in re-configuring the number of hosts and the actual lane partition without the need to re-wire the reference clock and the PERST signals.

In some embodiments, the peripheral device detects an implied reset condition. In the present context, the term "implied reset condition" refers to a condition that when met is indicative of imminent assertion of the physical reset (e.g., PCIe PERST) signal, e.g., by a given host. For example, the implied reset condition is met when the peripheral device detects a certain transition to link-down state in a state machine of the peripheral device. In response to detecting the implied reset condition, the peripheral device performs a suitable reset procedure that applies only to the link for which the reset condition was met. Using the implied reset mechanism, the peripheral device may detect implied reset conditions indicative of respective asserted PERST signals by multiple respective hosts. For example, when connected to N hosts using a single data lane per host, the peripheral device may separately detect up to N implied reset conditions related to N asserted PERST signals by the N hosts. In the description that follows, the "implied reset condition" is also referred simply as a "reset condition" for brevity.

Consider an embodiment of a peripheral device, comprising a bus interface and circuitry. The bus interface is configured to connect to a peripheral bus for communicating with a host in accordance with a peripheral-bus specification that specifies a physical reset signal asserted by the host. The circuitry is configured to execute predefined logic that evaluates a reset condition that is indicative of imminent assertion of the physical reset signal by the host, and to perform a reset procedure in response to meeting the reset condition.

In some embodiments, the predefined logic comprises a State Machine (SM) having multiple states and multiple transitions among the states, and the circuitry evaluates the reset condition by tracking the transitions among the states. In an example embodiment, the circuitry evaluates the reset condition by identifying a transition of the SM from a first state among the states in which a status of the link indicating that the link is up, to a second different state among the states in which the status of the link indicating that the link is down.

In an embodiment, the circuitry evaluates the reset condition irrespective of receiving any actual physical reset signal from the host. The bus interface of the peripheral device may have a physical reset input for receiving the physical reset signal from the host, but the circuitry evaluates the reset condition irrespective of a logical state of the physical reset input. Alternatively, the bus interface of the peripheral device does not comprise a physical reset input for receiving the physical reset signal from the host.

The peripheral bus may operate in accordance with any suitable peripheral-bus specification, e.g., a Peripheral Component Interconnect Express (PCIe) specification (e.g., PCIe 5.0 cited above), in which case the physical reset signal comprises a PERST signal of the PCIe specification.

In some embodiments, the circuitry communicates with the host over a link comprising one or more lanes of the peripheral bus, and decides that the reset condition is met by identifying that a status of the link has changed from indicating that the link is up to indicating that the link is down.

In some embodiments, the circuitry receives from the host one or more messages for requesting the peripheral device to enter a low power mode. The circuitry enters the low power mode in response to meeting the reset condition after receiving the one or more messages.

In some embodiments, the peripheral device detects de-assertion of the physical reset signal by sensing an impedance level of one or more of lanes of the relevant link.

The peripheral device may comprise any suitable type of a peripheral device such as, for example, one of: a network adapter, a Network Interface Card (NIC), a smart NIC, a Graphics Processing Unit (GPU), a Central Processing unit (CPU), a video compression module, and an acceleration device.

In an embodiment, the peripheral bus comprises N data lanes, N being an integer larger than 1, and the circuitry communicates with the host via the bus interface over a number of data lanes smaller than N.

In a multi-host configuration, the peripheral device connects over the peripheral bus to multiple hosts using multiple respective links, and the circuitry evaluates the reset condition associated with a given host among the multiple hosts, based at least on monitoring the link connecting between the peripheral device and the given host. The hosts may connect to the peripheral device using respective links having the same or different number of lanes per link. In some embodiments, the peripheral device comprises a video compression module, configured to receive from the hosts, over the respective links, raw video data for producing corresponding compressed video data, wherein the links comprise respective number of data lanes depending on video compression levels respectively required by the hosts.

In the disclosed techniques, a peripheral device detects a reset condition indicative on imminent assertion of a physical reset signal, even without receiving the physical reset signal. A wiring scheme between the peripheral device and hosts may exclude the physical reset signal, which simplifies the usage of the same peripheral device in different multi-host configurations.

System Description

Figure 1:
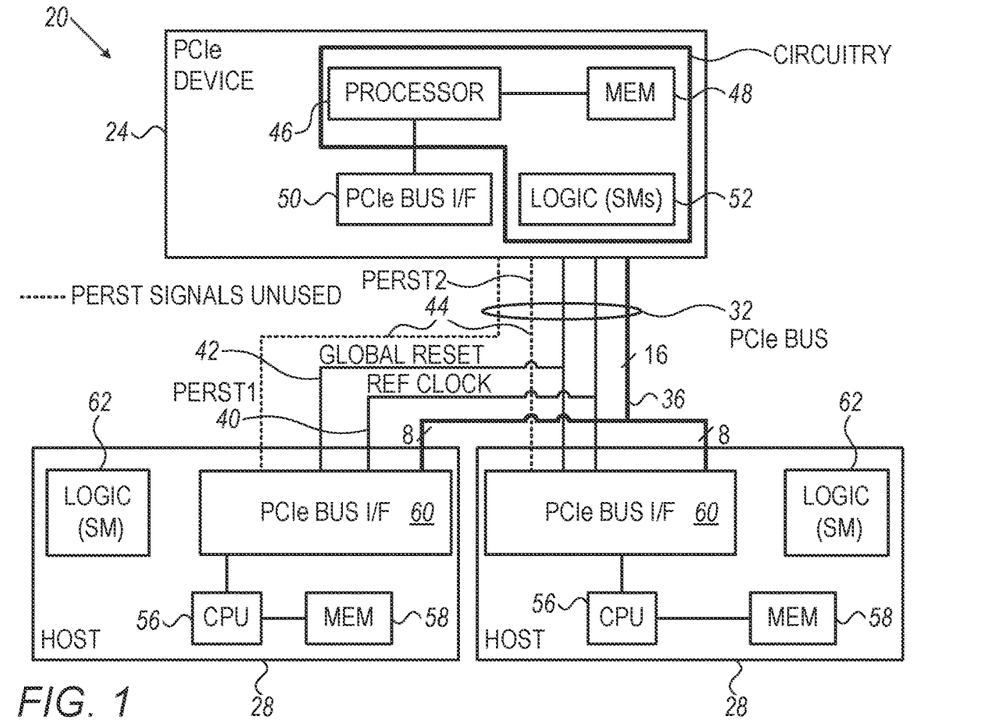
FIG. 1 is a block diagram that schematically illustrates a computing system in which a peripheral device connects to multiple hosts over a bus, in accordance with an embodiment that is described herein.

FIG. 1 is a block diagram that schematically illustrates a computing system 20 in which a peripheral device connects to multiple hosts over a bus, in accordance with an embodiment that is described herein.

In the example of computing system 20, a peripheral device 24 communicates with hosts 28 over a bus 32. Alternatively, the peripheral device may communicate with a single host or with more than two hosts over bus 32. Bus 32 may comprise any suitable bus operating in accordance with any suitable bus specification. In the description that follows it is mainly assumed that bus 32 comprises a peripheral component bus such as, for example, the Peripheral Component Interface Express (PCIe) bus operating in accordance, e.g., with any suitable PCIe specification, e.g., the PCIe 5.0 specification cited above. In other embodiments, however, other bus types can also be used.

Peripheral device 24 may comprise any suitable peripheral device such as, for example, a network adapter, a Network Interface Card (NIC), a smart NIC, a Graphics Processing Unit (GPU), a Central Processing unit (CPU), a video compression module, and an acceleration device.

In the present example, PCIe bus 32 comprises 16 lanes (36) for carrying data, wherein in this example the 16 lanes are split equally among the hosts, i.e., 8 lanes per host 28. In other embodiments, any other suitable number of lanes, and any suitable partition of the lanes among the hosts (e.g., an uneven partition) can also be used.

PCIe bus 32 further comprises physical control lines that carry control signals such a reference clock signal 40 and a global reset signal 42, which are both shared among hosts 28 and peripheral device 24.

In conventional configurations of peripheral bus 32, each of hosts 28 provides a reset signal 44 to the peripheral device, wherein in the PCIe specification this reset signal is also referred to as a "PCI Express Reset" (PERST) signal 44. In the description that follows, the term "PERST signal" refers generally to a physical reset signal as specified in a relevant standard, such a, for example, the PCIe PERST signal.

In some disclosed embodiments that will be described below, the physical lines carrying the respective PERST signals 44 remain unconnected at least at the peripheral device side. Alternatively, the lines carrying PERST signals 44 may be physically connected between the hosts and peripheral device, but are ignored by the peripheral device. Instead of receiving a physical PERST signal, the peripheral device detects implied reset conditions indicative of imminent assertion of the PERST signal, as will be described below.

The same wiring scheme comprising the shared reference clock signal and the global reset signal, and that omits the physical PERST signals is flexibly usable in various applications having different multi-host configurations, as will be described further below.

In accordance with the relevant PCIe specification, a fundamental reset is triggered when PERST signal 44 is asserted. A fundamental reset may comprise a cold reset or a warm reset. A cold reset is applied when power is applied to the peripheral device, whereas a warm reset is applied when the PERST signal is asserted without shutting off power to the peripheral device.

Conventionally the physical PERST signal of the host is connected to the peripheral device, and the assertion of the physical PERST signal by the host causes the peripheral device's state machines, hardware logic, port states and configuration registers (excluding sticky registers) to be initialized to their default conditions.

Peripheral device 24 comprises a processor 46 coupled to a memory 48. The processor implements at least part of the functionality of the peripheral device, e.g., depending on services that the peripheral device provides to hosts 28. Peripheral device 24 accesses peripheral bus 32 via a bus interface 50, e.g., a PCIe bus interface. In some embodiments, the peripheral bus comprises N>1 lanes, and the peripheral device communicates with the host via the bus interface over a number of lanes smaller than N.

The bus interface comprises logic circuit 52, such as one or more State Machine (SMs), that handles link training and initialization. In the present example, logic circuit 52 comprises two SMs (not shown), for handling the respective two 8-lane links of the peripheral bus. In the PCIe specification, SM 52 is also referred to as a "Link Training and Status State Machine" (LTSSM). In some embodiments, logic circuit 52 implements one or more communication layers, e.g., a physical layer.

Host 28 comprises a Central Processing unit (CPU) 56 coupled to a memory 58. The CPU handles various tasks of the host as required in computing system 20. CPU 56 accesses peripheral bus 32 via a bus interface 60, e.g., a PCIe bus interface. The bus interface comprises logic circuit 62, such as a State Machine (SM), that handles link training and initialization. In the PCIe specification, SM 62 is also referred to as a "Link Training and Status State Machine" (LTSSM).

In some embodiments, logic circuit 62 implements one or more communication layers, e.g., a physical layer.

Typically, SMs 52 in peripheral device 24 and SMs 62 in hosts 28 operate in accordance with a common specification of the underlying peripheral bus.

As noted above, in computing system 20, peripheral device 24 does not receive any PERST signals from hosts 28. As will be described in detail below, logic circuit 52 is configured to detect a reset condition that is indicative of imminent assertion of the PERST signal by a given host, even without receiving a physical PERST signal from that host.

In some embodiments, logic circuit 52 detects an implied reset condition irrespective of receiving any actual physical reset signal (e.g., a PERST signal) from the host. In an embodiment, the bus interface of the peripheral device comprises a physical reset input for receiving the physical reset signal from the host, but the logic circuit (52) evaluates the reset condition irrespective of a logical state of the physical reset input. In another embodiment, the bus interface of the peripheral device does not comprise a physical reset input for receiving the physical reset signal from the host.

Although in FIG. 1 computing system 20 comprises two hosts, in other embodiments a number N of hosts larger than two can also be used. In some embodiments, peripheral device 24 supports configurable partition of N lanes among links for connecting to multiple hosts (up to N hosts). Moreover, the wiring scheme in which the reference clock signal and the global reset signal are shared among the peripheral device and the hosts, and that omits connection of physical PERST signals, enables flexible usage of the peripheral device in various multi-host configurations. This means that the same peripheral device having N data lanes can be used in different systems having different respective numbers of hosts (up to N hosts) and/or different respective partitions of the lanes among the hosts.

In the example of FIG. 1, the lanes of the peripheral bus 32 are partitioned equally between the hosts. In some embodiments, an uneven partition of the lanes is required, e.g., in providing video compression offloading, as described herein.

In some embodiments, peripheral device 24 that connects to multiple hosts 28 comprises a video compression module. The peripheral device receives raw video data from the hosts, over respective links of the peripheral bus, and applies any suitable video compression scheme (or schemes) to the raw video data to produce compressed video data. In applications in which the multiple hosts require similar respective video compression levels, the peripheral device connects to the hosts using links having the same number of lanes. In other applications, when two hosts require different respective levels of video compression than the other hosts, the peripheral device connects to these hosts using links having different respective number of lanes. Assume a first host that requires a first video compression level, and a second host that require a second compression level, lower than the first compression level. In this case, the first host will be connected to the peripheral device using a number of lanes larger than the second host.

In the example of FIG. 1, the elements of the PCIe device that are external to PCIe bus interface 50 are collectively referred to as "circuitry." In this example, the circuitry comprises processor 46, memory 48 and logic circuit 52. In other embodiments, other partitions of the peripheral device, in which some or all of logic circuit 52 may reside within the PCIe bus interface.

Figure 2:
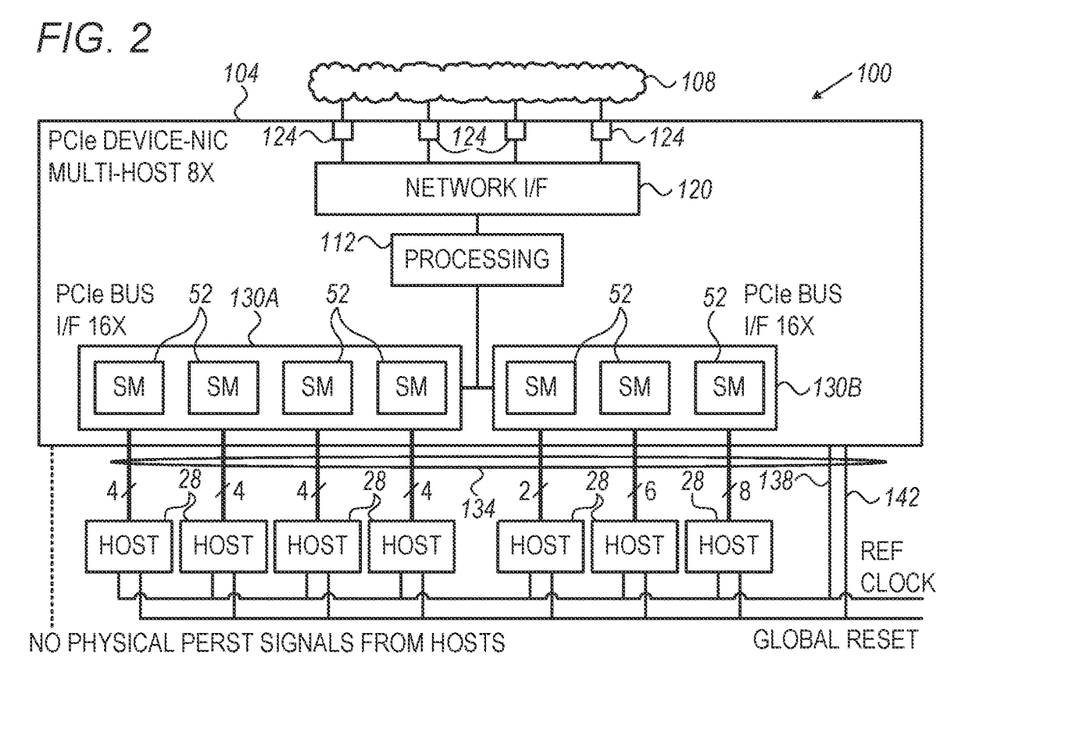
FIG. 2 is a block diagram that schematically illustrates a computing system in which a peripheral device comprises a network adapter serving multiple hosts, in accordance with an embodiment that is described herein.

FIG. 2 is a block diagram that schematically illustrates a computing system 100 in which a peripheral device comprises a network adapter serving multiple hosts, in accordance with an embodiment that is described herein.

In computing system 100, a network adapter 104 interfaces between multiple hosts 28 and a communication network 108. Network adapter 104 may comprise any suitable interface to the communication network such as, for example, a Network Interface Card (NIC) or a smart NIC. Communication network 108 may comprise any suitable packet network operating using any suitable communication protocols, such as, for example, an Ethernet network or an InfiniBand™ network.

Network adapter 104 comprises processing logic 112 that handles the transfer of data between hosts 28 and communication network 108. Processing logic 112 receives packets from and transmits packets to the communication network via a network interface 120, which is coupled to the communication network using network ports 124.

Processing logic 112 receives data from hosts 28 for transmission to the communication network, and transmits the data to the communication network via the network interface. Processing logic 112 also receives data (carried in packets) from the communication network and transmits the data to the hosts via PCIe bus interfaces 130A and 130B, each of which comprises 16 data lanes of a 32-lane PCIe bus 134.

In the present example, PCIe bus interface 130A connects to four hosts 28 using four respective 4-lane links. These four links are handled using four respective SMs 52. PCIe bus interface 130B connects to three hosts using links having 2, 6 and 8 data lanes, respectively. These three links are handled using three respective SMs 52. In general, a higher number of lanes in a link enables transmission over the link at a higher data rate.

Computing system 100 comprises a reference clock signal 138 and a global reset signal 142. Each of the reference clock signal and the global reset signal is common to hosts 28 and network adapter 104.

It should be noted that similarly to computing system 20 above, the peripheral device (104) does not receive any PERST signal from any of hosts 28. Instead, the peripheral device detects an implied reset condition, as will be descried below.

NIC 104 comprises a PCIe device supporting configurable partition of N lanes among links for connecting to multiple hosts. Moreover, the wiring scheme in which the reference clock signal and the global reset signal are shared among the peripheral device (NIC) and the hosts, and that omits connections of physical PERST signals, enables flexible usage of the NIC in various multi-host configurations. This means that the same NIC can be used in different systems having different respective numbers of hosts (up to N=32 hosts in the present example) and/or different respective partitions of the lanes among the hosts.

Figure 3:
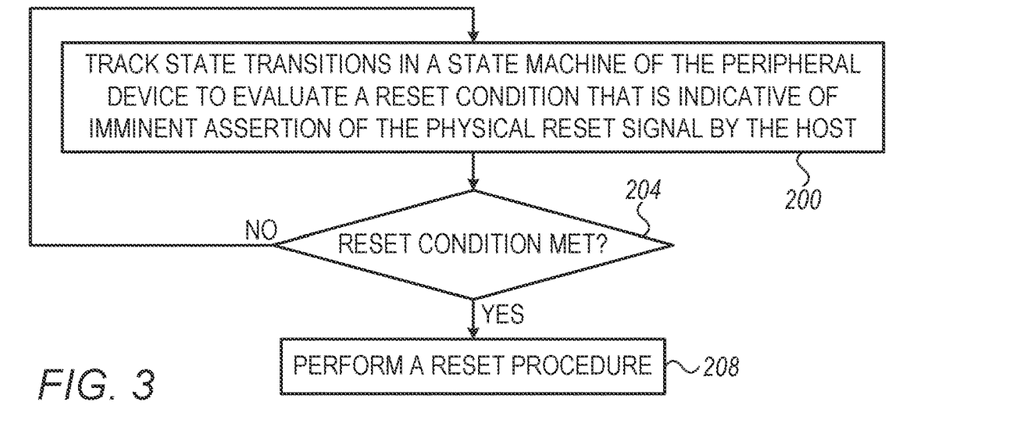
FIG. 3 is a flow chart that schematically illustrates a method for identifying an implied reset condition, irrespective of receiving any actual physical reset signal, in accordance with an embodiment that is described herein.

FIG. 3 is a flow chart that schematically illustrates a method for identifying an implied reset condition, irrespective of receiving any actual physical reset signal, in accordance with an embodiment that is described herein.

In the present example, the method will be described as executed by predefined logic circuit 52 of peripheral device 24 of FIG. 1.

The method begins at a monitoring step 200, with logic circuit 52 tracking state transitions in a link state machine (LTSSM) of the peripheral device to evaluate a reset condition that is indicative of imminent assertion of the physical reset signal (PERST in PCIe) by the host. At a condition checking step 204, the logic circuit (52) checks whether the reset condition has been met, and if not, loops back to step 200 to continue monitoring the peripheral bus. Otherwise, the logic circuit proceeds to a reset application step 208, at which the logic circuit performs a reset procedure.

In an embodiment, in performing the reset procedure, the peripheral device refrains from resetting the sticky registers in the PCIe configuration space. In some embodiments, the peripheral device performs a reset procedure specified in the relevant PCIe specification.

In some embodiments, the predefined logic circuit comprises a State Machine (SM) having multiple states and multiple transitions among the states. For example, the SM may comprise the Link Training and Status State Machine (LTSSM) specified in the underlying PCIe specification. In such embodiments, logic circuit 52 is configured to evaluate the reset condition at least by tracking the transitions among the states of the SM.

In an embodiment, the logic circuit is configured to communicate with a host over a link comprising one or more lanes of the peripheral bus, and to decide that the reset condition is met by identifying that a status of the link has changed from indicating that the link is up to indicating that the link is down. In an embodiment in which the logic circuit comprises a SM, the logic circuit is configured to evaluate the reset condition by identifying a transition of the SM from a first state in which a status of the link indicating that the link is up, to a second different state in which the status of the link indicating that the link is down.

Although the method of FIG. 3 was described for a given host, the method is applicable to multiple hosts connected to the peripheral device using multiple respective links having respective number of lanes. In a multi-host case of this sort, the logic circuit monitors the multiple links, and may detect separate reset conditions associated with the respective hosts in response to each host asserting its own PERST signal.

The description above mainly addressed the detection of the implied reset that indicates imminent assertion of the physical PERST signal. In a practical implementation, however, it is important that the peripheral device will also be able to detect de-assertion of the PERST signal by the host. Embodiments that support detection the de-assertion of a PERST signal are described herein.

Assume a single host asserting the PERST signal. In accordance with the PCIe specification, the host may retain the PERST signal asserted until the host finishes to perform a receiver calibration procedure. Conventionally, an asserted physical PERST signal prevents the peripheral device from transmitting to the host, which could damage the calibration process of the PCIe receiver at the host side. In some embodiments, a host that connects to a peripheral device that supports detecting an implied reset, is required to retain its PCIe receiver termination at a high impedance until the host is ready to de-assert the PERST signal. The peripheral device can therefore detect de-assertion of the PERST signal based on the impedance of one or more lanes via which the peripheral device connects to the host, as described herein with reference to FIG. 4.

Figure 4:
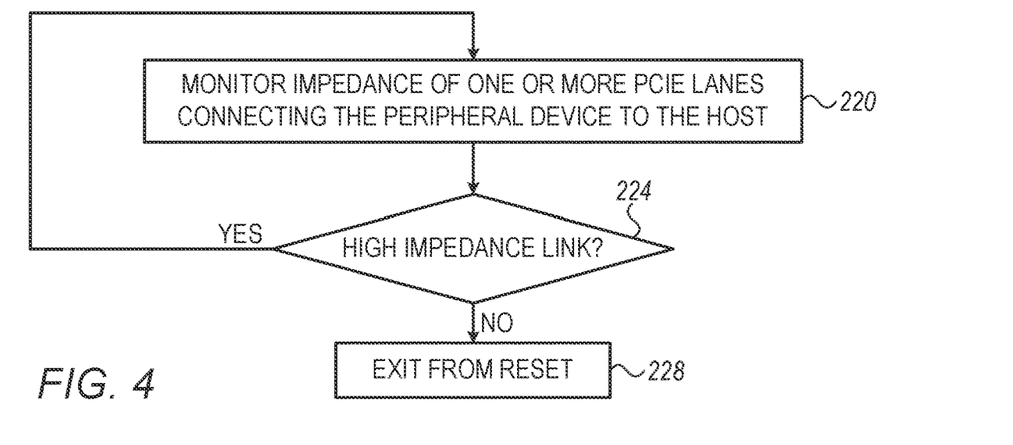
FIG. 4 is a flow chart that schematically illustrates a method for detecting de-assertion of a physical reset signal, in accordance with an embodiment that is described herein.

FIG. 4 is a flow chart that schematically illustrates a method for detecting de-assertion of a physical reset signal, in accordance with an embodiment that is described herein.

The method will be described as executed by logic circuit 52 of peripheral device 24 of FIG. 1. In describing the method it is assumed that a host that connects using one or more lanes to the peripheral device has asserted a physical PERST signal, which was detected by the peripheral device as an implied reset, e.g., using the method of FIG. 3 above.

The method of FIG. 4 begins at a monitoring step 220, with logic circuit 52 sensing the impedance of one or more lanes connecting between the peripheral device and the host. At an impedance level checking step 224, the logic circuit checks whether the sensed impedance level of one or more of the lanes exceeds a predefined threshold impedance, and if so, loops back to step 220 to continue monitoring the impedance of the lanes. Otherwise, the logic circuit proceeds to a de-assertion step 228, at which the logic circuit exits from the reset state. For example, at step 228, the logic circuit starts link training by transmitting to the host.

Although the method of FIG. 4 was described for a single host, the method similarly applies to a peripheral device that connects using multiple respective links to multiple hosts. In this case, the peripheral device separately monitors the impedances of the lanes in the different links to detect de-assertion of the PERST signals by the respective hosts.

In some embodiments, one host coordinates the operation of all other hosts so that the other hosts are not detected by the peripheral device during receiver detection process, until these hosts are ready for raising their links.

In some embodiments, a host requests the peripheral device to enter a low power mode of operation. The "low power mode" is also referred to as a "standby mode." In accordance with the underlying PCIe specification, a host may request a peripheral device to enter a low power mode of operation by sending to the peripheral device certain messages, followed by assertion of the physical PERST signal. In some embodiments, since the peripheral device does not receive (or ignores) the physical PERST signal, the peripheral device enters the low power mode based on the implied reset condition, as will be described herein with reference to FIG. 5.

Figure 5:
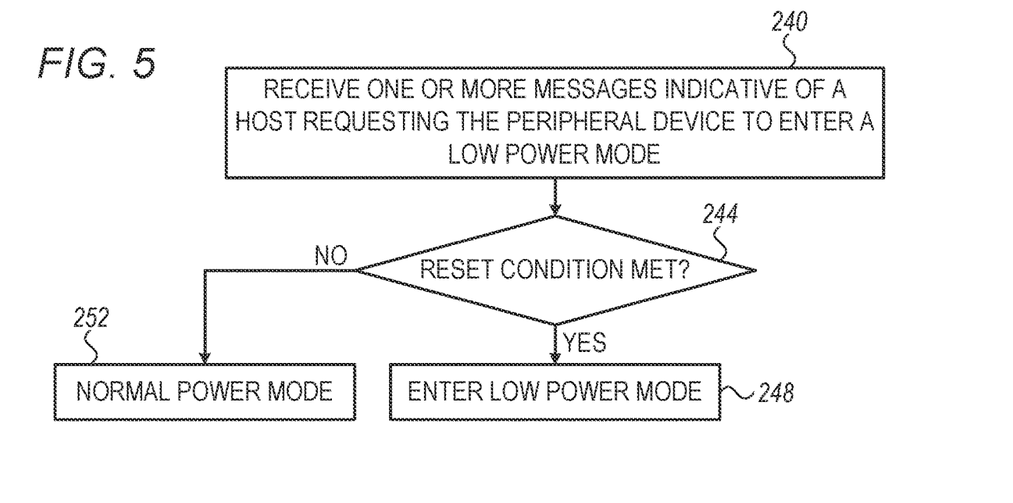
FIG. 5 is a flow chart that schematically illustrates a method for entering a low power mode in a peripheral device, in accordance with an embodiment that is described herein.

FIG. 5 is a flow chart that schematically illustrates a method for entering a low power mode in a peripheral device, in accordance with an embodiment that is described herein.

The method will be described as executed by logic circuit 52 of peripheral device 24 of FIG. 1.

The method begins at a message reception step 240, with logic circuit 52 receiving from one of the hosts one or more messages indicative of the host requesting the peripheral device to enter a low power mode. At a reset condition testing step 244, the logic circuit checks whether an implied reset condition is met. To this end, the logic circuit monitors the peripheral bus as described above, e.g., at step 200 of the method of FIG. 3 above. When the implied reset condition is met, the logic circuit enters a low power mode at a low power mode entering step 248. Otherwise, the logic control continues to operate in the normal power mode, at a normal power step 252. Following each of steps 248 and 252 the method terminates.

The method of FIG. 5 was described for a case in which one of the hosts that connects to the peripheral device controls the entrance of the peripheral device to the low power mode. In other embodiments, multiple hosts control the entrance of the peripheral device to the low power mode. In such embodiments, the peripheral device enters the low power mode after (i) receiving a message from each host, and (ii) detecting implied reset conditions associated respectively with all the hosts. It is assumed that the hosts coordinate among themselves a suitable order of transmitting the messages and asserting the physical PERST signals. In an example embodiment, one of the hosts coordinates the entrance to low power mode with all other hosts.

Additional Example Compute Systems

Figure 6:
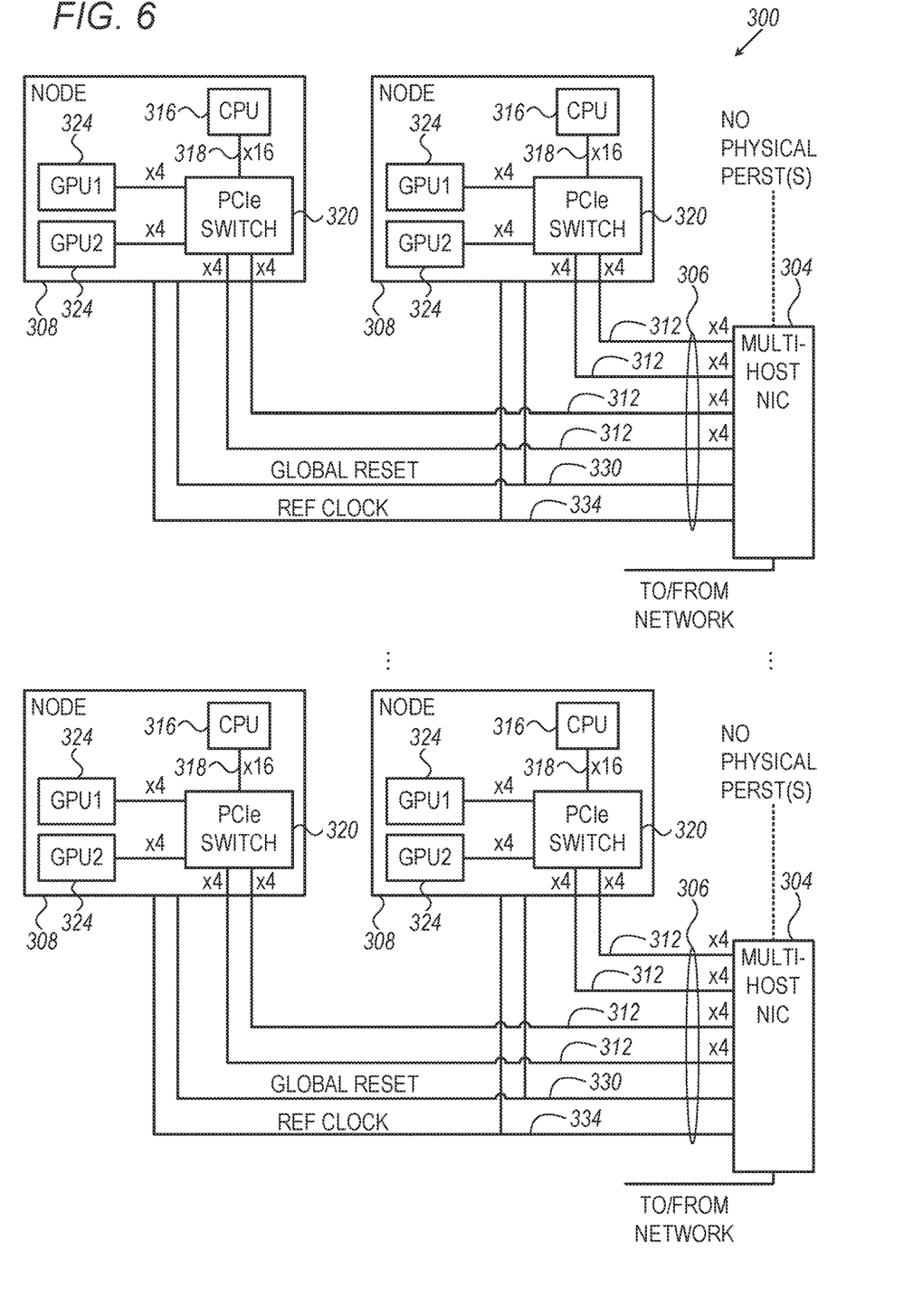
FIG. 6 is a block diagram that schematically illustrates a computing system in which multiple peripheral devices that function as network adapters serve multiple respective compute nodes, in accordance with an embodiment that is described herein.

FIG. 6 is a block diagram that schematically illustrates a computing system 300 in which multiple peripheral devices that function as network adapters serve multiple respective compute nodes, in accordance with an embodiment that is described herein.

Computing system 300 comprises multiple NICs 304, each of which comprises a peripheral device (not shown) serving multiple compute nodes 308. In the present example, each of NICs 304 connects to a 16-lane PCIe bus 306 that is partitioned into four PCIe links 312 of four lanes per link. NIC 304 may be implemented, for example, using PCIe device 104 of FIG. 2 above. In alternative embodiments, a computer system having a single NIC 204 can also be used.

In the present example, compute node 308 comprises a CPU 316 that connects over a 16-lane PCIe bus 318 to a PCIe switch 320 and to Graphic Processor units (GPUs) 324 (two GPUs per compute node in this example). In the configuration of FIG. 6, CPU 316 communicates over two physical 4-lane PCIe links with NIC 304, and communicates locally over a 4-lane PCIe link with each of GPUs 324. Moreover, each GPU 324 is accessible via the PCIe switch by the NIC over a 4-lane PCIe link.

Although in FIG. 6, the CPU is coupled to GPUs, in alternative embodiments, the CPU may be locally coupled to any other processing element, e.g., an accelerator that offloads computational and other operations from the CPU.

In the example of FIG. 6, NIC 304 and network nodes 308 served by that NIC receive a common global reset signal 330 and a common reference clock signal 334.

In some embodiments, NIC 304 does not receive any physical PERST signals from compute nodes 308. In such embodiments, NIC 304 identifies implied reset conditions indicative of physical PERST signals asserted by the compute nodes, as described above. In the present example, each node 308 supports two PERST signals (not shown), one for each 4X link of the NIC, but that are not connected to NIC 304.

In some embodiments, the connectivity between NIC 304 and compute nodes 308 is flexible and does not require wiring of any physical PERST signals. This means that the same NIC that supports a 16-lane PCIe bus, may also serve other connection configurations to the compute nodes. For example, in another embodiment, the 16 lanes of a single NIC 304 may be connected to four compute nodes 308 using a 4-lane link per compute node. In this configuration, only half of the data rate can be communicated with each host, compared to using 8 lanes per link. In another embodiment, the NIC may connect by a single PCIe lane to each of 16 hosts 308, with further reduction of the data rate per host. In yet another embodiment, NIC 304 may connect to multiple hosts via respective PCIe links, wherein at least two of these PCIe links comprise different respective numbers of lanes.

Figure 7:
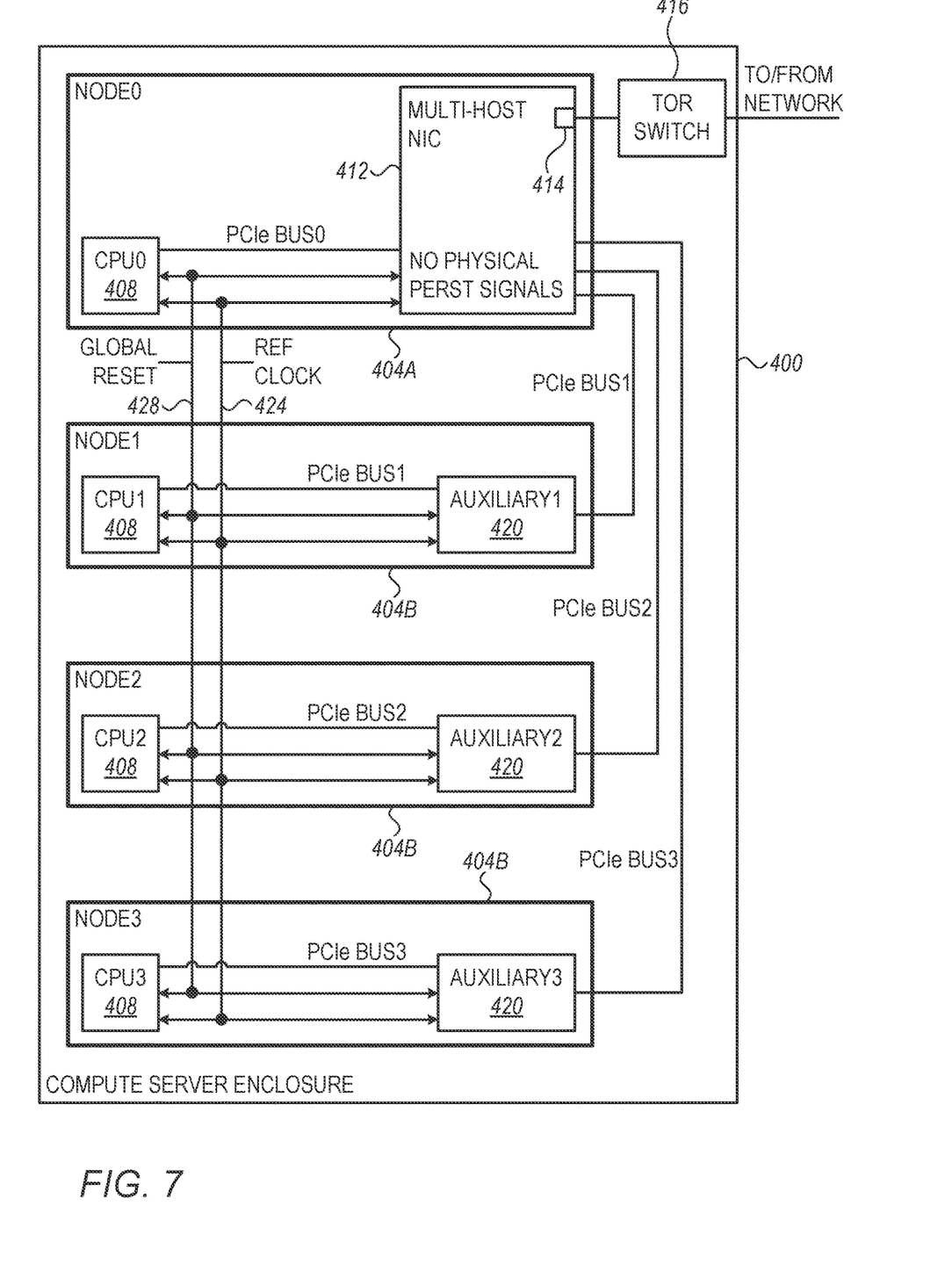
FIG. 7 is a block diagram that schematically illustrates a compute server in which a peripheral device that functions as a network adapter serves multiple compute nodes, in accordance with an embodiment that is described herein.

FIG. 7 is a block diagram that schematically illustrates a compute server 400 in which a peripheral device that functions as a network adapter serves multiple compute nodes, in accordance with an embodiment that is described herein.

In the present example, compute server 400 comprises four compute nodes, wherein compute node 404A is denoted NODE0 and compute nodes 404B are denoted NODE1 . . . NODE3, wherein compute nodes NODE0 . . . NODE3 comprising respective CPUs 408 denoted CPU0 . . . CPU3. Alternatively, any other number of compute nodes in compute server 400 other than four can also be used. Compute node NODE0 comprises a peripheral device 412 that functions as multi-host NIC. NIC 412 comprises a network port 414 for accessing any suitable communication network via a Top of the Rack (ToR) switch 416. NIC 412 may be implemented, for example, using PCIe device 104 of FIG. 2 above.

NIC 412 provides host CPUs 408 with access to the communication network. CPU 408 denoted CPU0 (of NODE0) connects to NIC 412 using a PCIe bus (or link) denoted PCIe BUS0. CPUs 408 denoted CPU1 . . . CPU3 connect to NIC 412 using respective PCIe buses (or links) denoted PCIe BUS1 . . . PCIe BUS3 and via respective auxiliary cards 420. NIC 412 and CPUs 408 use respective logic circuits (not shown) for handling the PCIe busses. For example, logic circuit 52 of FIG. 1 (or similar) can be used at the NIC side, and logic circuit 62 of FIG. 1 (or similar) can be used at the CPU (or auxiliary card) side.

Compute server 400 comprises a reference clock signal 424 and a global reset signal 428 that are distributed within the server enclosure to all compute nodes NODE0 . . . NODE3 (e.g., to CPUs 408, NIC 412 and auxiliary cards 420). In the configuration of FIG. 7, the NIC does not receive any physical PERST signals from CPUs 408, and instead can detect implied reset conditions associated with the respective host CPUs, as described above.

In some embodiments, NIC 412 supports flexible partition of PCIe data lanes among the PCIe busses (links) of the hosts. Consequently, at least one CPU may be allocated a number of lanes different from the number of lanes allocated to other CPUs.

The flexibility in allocation of the lanes and the exclusion of the physical PERST signals, allows using the same NIC 412 in servers having different configurations, e.g., having different respective number of CPUs, and/or different numbers of lanes per CPU. Therefore, there is no need to produce different NICs 412 to support different multi-host configuration.

The configurations of computing systems 20, 100, 300, compute server 400, peripheral devices 24, 104, 304 and 412, hosts 28, compute nodes 308 and compute nodes 404A and 404B in respective FIGS. 1, 2, 6 and 7 are example configurations, which are chosen purely for the sake of conceptual clarity. In alternative embodiments, other suitable computing systems, compute server, peripheral device, host and compute node configurations can also be used. Elements that are not necessary for understanding the principles of the present invention, such as various interfaces, addressing circuits, timing and sequencing circuits and debugging circuits, have been omitted from the figures for clarity.

Some elements of peripheral devices 24, 104, 304 and 412, such as processor 46, peripheral bus interface 50, peripheral bus interfaces 130A and 130B, logic circuit 52 and processing logic 112, some elements of hosts 28 such as CPU 56, peripheral bus interface 60, and logic circuit 62, some elements of compute nodes 308 such as CPUs 316 and GPUs 324, and some elements of compute nodes 404A and 404B, such as CPUs 408 and auxiliary cards 420, may be implemented in hardware, e.g., in one or more Application-Specific Integrated Circuits (ASICs) or FPGAs. Additionally or alternatively, processor 46, peripheral bus interface 50, peripheral bus interfaces 130A and 130B, logic circuit 52, processing logic 112, CPU 56, peripheral bus interface 60, logic circuit 62, CPUs 316, GPUs 324, CPUs 408 and auxiliary cards 420, can be implemented using software, or using a combination of hardware and software elements. Memory 48 of peripheral device 24 and memory 58 of host 28 may comprise any suitable storage element such as, for example, a Random-Access Memory (RAM), or a Nonvolatile (NVM) memory such as a Flash memory device.

In some embodiments, some of the functions of processor 46, logic circuit 52, CPU 56, logic circuit 62, processing logic 112, CPU 316, GPU 324 and CPU 408 may be carried out by general-purpose processors, which are programmed in software to carry out the functions described herein. The software may be downloaded to the relevant processor in electronic form, over a network, for example, or it may, alternatively or additionally, be provided and/or stored on non-transitory tangible media, such as magnetic, optical, or electronic memory.

The embodiments described herein are given by way of example, and other suitable embodiments can also be used.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A peripheral device, comprising:
   a bus interface, configured to connect to a peripheral bus for communicating with a host in accordance with a peripheral-bus specification that specifies a physical reset signal asserted by the host; and
   circuitry, configured to:
   execute predefined logic that evaluates a reset condition that is indicative of imminent assertion of the physical reset signal by the host; and
   perform a reset procedure in response to meeting the reset condition.

2. The peripheral device according to claim 1, wherein the predefined logic comprises a State Machine (SM) having multiple states and multiple transitions among the states, and wherein the circuitry is configured to evaluate the reset condition by tracking the transitions among the states.

3. The peripheral device according to claim 2, wherein the circuitry is configured to evaluate the reset condition by identifying a transition of the SM from a first state among the states in which a status of the link indicating that the link is up, to a second different state among the states in which the status of the link indicating that the link is down.

4. The peripheral device according to claim 1, wherein the circuitry is configured to evaluate the reset condition irrespective of receiving any actual physical reset signal from the host.

5. The peripheral device according to claim 1, wherein the bus interface of the peripheral device comprises a physical reset input for receiving the physical reset signal from the host, but the circuitry is configured to evaluate the reset condition irrespective of a logical state of the physical reset input.

6. The peripheral device according to claim 1, wherein the bus interface of the peripheral device does not comprise a physical reset input for receiving the physical reset signal from the host.

7. The peripheral device according to claim 1, wherein the peripheral-bus specification comprises a Peripheral Component Interconnect Express (PCIe) specification, and wherein the physical reset signal comprises a PERST signal of the PCIe specification.

8. The peripheral device according to claim 1, wherein the circuitry is configured to communicate with the host over a link comprising one or more lanes of the peripheral bus, and to decide that the reset condition is met by identifying that a status of the link has changed from indicating that the link is up to indicating that the link is down.

9. The peripheral device according to claim 1, wherein the circuitry is configured to receive from the host one or more messages for requesting the peripheral device to enter a low power mode, and to enter the low power mode in response to meeting the reset condition after receiving the one or more messages.

10. The peripheral device according to claim 1, wherein the peripheral device is selected from a list comprising: a network adapter, a Network Interface Card (NIC), a smart NIC, a Graphics Processing Unit (GPU), a Central Processing unit (CPU), a video compression module, and an acceleration device.

11. The peripheral device according to claim 1, wherein the peripheral bus comprises N data lanes, N being an integer larger than 1, and wherein the circuitry is configured to communicate with the host via the bus interface over a number of data lanes smaller than N.

12. The peripheral device according to claim 1, wherein the circuitry is configured to communicate with the host over one or more data lanes of the peripheral bus, and to detect de-assertion of the physical reset signal by the host, by sensing an impedance level of one or more of the data lanes.

13. The peripheral device according to claim 1, wherein the peripheral device connects over the peripheral bus to multiple hosts using multiple respective links, and wherein the circuitry is configured to evaluate the reset condition associated with a given host among the multiple hosts, based at least on monitoring a link comprising one or more data lanes that connect between the peripheral device and the given host.

14. The peripheral device according to claim 13, wherein the peripheral bus comprises multiple data lanes, and wherein first and second links used for connecting first and second hosts among the multiple hosts, comprise different respective first and second numbers of the data lanes.

15. The peripheral device according to claim 13, wherein the peripheral device comprises a video compression module, configured to receive from the hosts, over the respective links, raw video data for producing corresponding compressed video data, wherein the links comprise respective number of data lanes depending on video compression levels respectively required by the hosts.

16. A method, comprising:
    in a peripheral device that connects using a bus interface to a peripheral bus for communicating with a host in accordance with a peripheral-bus specification that specifies a physical reset signal asserted by the host,
    executing predefined logic that evaluates a reset condition that is indicative of imminent assertion of the physical reset signal by the host; and
    performing a reset procedure in response to meeting the reset condition.

17. The method according to claim 16, wherein the predefined logic comprises a State Machine (SM) having multiple states and multiple transitions among the states, and wherein monitoring the peripheral bus comprises evaluating the reset condition by tracking the transitions among the states.

18. The method according to claim 17, wherein monitoring the peripheral bus comprises evaluating the reset condition by identifying a transition of the SM from a first state among the states in which a status of the link indicating that the link is up, to a second different state among the states in which the status of the link indicating that the link is down.

19. The method according to claim 16, wherein monitoring the peripheral bus comprises evaluating the reset condition irrespective of receiving any actual physical reset signal from the host.

20. The method according to claim 16, wherein the bus interface of the peripheral device comprises a physical reset input for receiving the physical reset signal from the host, but monitoring the peripheral bus comprises evaluating the reset condition irrespective of a logical state of the physical reset input.

21. The method according to claim 16, wherein the bus interface of the peripheral device does not comprise a physical reset input for receiving the physical reset signal from the host.

22. The method according to claim 16, wherein the peripheral-bus specification comprises a Peripheral Component Interconnect Express (PCIe) specification, and wherein the physical reset signal comprises a PERST signal of the PCIe specification.

23. The method according to claim 16, and comprising communicating with the host over a link comprising one or more lanes of the peripheral bus, and deciding that the reset condition is met by identifying that a status of the link has changed from indicating that the link is up to indicating that the link is down.

24. The method according to claim 16, and comprising receiving from the host one or more messages for requesting the peripheral device to enter a low power mode, and entering the low power mode in response to meeting the reset condition after receiving the one or more messages.

25. The method according to claim 16, wherein the peripheral device is selected from a list comprising: a network adapter, a Network Interface Card (NIC), a smart NIC, a Graphics Processing Unit (GPU), a Central Processing unit (CPU), a video compression module, and an acceleration device.

26. The method according to claim 16, wherein the peripheral bus comprises N data lanes, N being an integer larger than 1, and comprising communicating with the host via the bus interface over a number of data lanes smaller than N.

27. The method according to claim 16, and comprising communicating with the host over one or more data lanes of the peripheral bus, and detecting de-assertion of the physical reset signal by the host, by sensing an impedance level of one or more of the data lanes.

28. The method according to claim 16, wherein the peripheral device connects over the peripheral bus to multiple hosts using multiple respective links, and wherein monitoring the peripheral bus comprises evaluating the reset condition associated with a given host among the multiple hosts, based at least on monitoring a link comprising one or more data lanes that connect between the peripheral device and the given host.

29. The method according to claim 28, wherein the peripheral bus comprises multiple data lanes, and wherein first and second links used for connecting first and second hosts among the multiple hosts, comprise different respective first and second numbers of the data lanes.

30. The method according to claim 28, wherein the peripheral device comprises a video compression module, that receives from the hosts, over the respective links, raw video data for producing corresponding compressed video data, wherein the links comprise respective number of data lanes depending on video compression levels respectively required by the hosts.

* * * * *